(12) United States Patent
Babcock et al.

(10) Patent No.: US 8,113,678 B2
(45) Date of Patent: Feb. 14, 2012

(54) LIGHTED RETAIL DISPLAY SHELVING

(75) Inventors: Leonard K. Babcock, Dover, DE (US); Kenneth S. Christianson, Clayton, DE (US)

(73) Assignee: Metal Masters Foodservice Equipment Co., Inc., Clayton, DE (US)

( * ) Notice: Subject to any disclaimer, the term of this patent is extended or adjusted under 35 U.S.C. 154(b) by 5 days.

(21) Appl. No.: 12/507,177

(22) Filed: Jul. 22, 2009

(65) Prior Publication Data

US 2011/0017102 A1 Jan. 27, 2011

(51) Int. Cl.
*A47F 11/10* (2006.01)
*A47B 9/00* (2006.01)

(52) U.S. Cl. ............... 362/125; 362/217.01; 362/249.02; 362/249.01; 312/223; 108/107

(58) Field of Classification Search ............ 362/92, 362/125, 126, 133, 134, 217.01, 217.16, 362/223–225, 249.02, 260, 329, 455; 248/241, 248/243; 312/128, 223.5
See application file for complete search history.

(56) References Cited

U.S. PATENT DOCUMENTS

| | | | | |
|---|---|---|---|---|
| 3,998,025 | A | | 12/1976 | Nestroy |
| 3,999,475 | A | * | 12/1976 | Roderick .................. 99/474 |
| 4,034,683 | A | * | 7/1977 | DiCenzo .................. 108/107 |
| 4,930,055 | A | * | 5/1990 | Swadell .................. 362/244 |
| 5,072,343 | A | * | 12/1991 | Buers .................. 362/125 |
| 5,083,791 | A | * | 1/1992 | Coombes, Jr. .................. 273/237 |
| 5,722,544 | A | * | 3/1998 | Williams .................. 211/188 |
| 5,860,715 | A | | 1/1999 | Lohde et al. |
| 5,895,111 | A | * | 4/1999 | Santosuosso et al. .................. 362/125 |
| 6,431,090 | B1 | * | 8/2002 | Davis et al. .................. 108/107 |
| 6,681,705 | B2 | * | 1/2004 | Wetterberg .................. 108/155 |
| 6,802,635 | B2 | * | 10/2004 | Robertson et al. .................. 362/555 |
| 7,244,040 | B2 | * | 7/2007 | Chen .................. 362/152 |
| D554,282 | S | | 10/2007 | Flaherty et al. |
| 7,322,714 | B2 | * | 1/2008 | Barnett et al. .................. 362/152 |
| 7,367,685 | B2 | * | 5/2008 | Moll .................. 362/133 |
| 7,441,919 | B2 | * | 10/2008 | Sheridan .................. 362/152 |
| 7,588,343 | B1 | * | 9/2009 | Carter et al. .................. 362/152 |
| 2005/0213316 | A1 | | 9/2005 | Inman et al. |
| 2007/0008717 | A1 | | 1/2007 | Flaherty |
| 2007/0159820 | A1 | * | 7/2007 | Crandell et al. .................. 362/249 |
| 2009/0116228 | A1 | * | 5/2009 | Otsuki et al. .................. 362/125 |
| 2009/0135587 | A1 | * | 5/2009 | Oketani et al. .................. 362/125 |
| 2009/0267463 | A1 | * | 10/2009 | Nilsson .................. 312/138.1 |

* cited by examiner

*Primary Examiner* — Hargobind S Sawhney
(74) *Attorney, Agent, or Firm* — Connolly Bove Lodge & Hutz LLP

(57) ABSTRACT

A retail shelving assembly comprises a plurality of upright posts, each post having upper and lower portions. At least one horizontally disposed shelf if releasably and adjustably connected to the posts. At least some of the posts comprise transparent light transmitting material, and a light source is associated with those posts for illuminating the posts to thereby produce a decorative and eye catching affect.

9 Claims, 5 Drawing Sheets

LIGHTED RETAIL DISPLAY SHELVING

BACKGROUND OF THE INVENTION

The present invention relates to a shelving assembly, and more particularly to an adjustable shelving assembly with upright lighted posts.

Readily adjustable shelving systems are well known in the art. Many of these systems comprise upright vertical posts with a plurality of vertically spaced apart horizontal shelves adjustably attached to the posts. These shelving systems are particularly useful anywhere shelf type storage and/or display is needed, and one such usage is in connection with retail sales where any number of items are on display for direct purchase by the consumer. Any manner in which the shelving can be made more attractive or eye catching is a benefit to such retail sales.

SUMMARY OF THE INVENTION

Among the objects of the present invention is an adjustable shelving assembly with lighted posts that produce both a functional and decorative affect.

Another object of the present invention is an adjustable shelving assembly with posts that emit white light or light of varying hues.

Another object of the present invention is an adjustable shelving with lighted posts which are easily energized to produce a decorative and eye catching affect.

Still another object of the present invention is a decorative shelving assembly where the elevation of the shelving is easy to adjust in an efficient and user friendly manner.

In accordance with the present invention, a retail shelving assembly comprises a plurality of upright posts each having upper and lower end portions, and at least one horizontally disposed shelf releasably and adjustably connected to the posts. At least some of the posts are made from transparent light transmitting material, and a light source is constructed and arranged to illuminate those posts.

The posts of the retail shelving assembly may comprise two front posts and two rear posts, and the two front posts may comprise transparent light transmitting material illuminated by the light source. In one embodiment, the light source may comprise an individual light at the lower end portion of each of the front posts, Alternatively, both the front and rear posts may comprise transparent light transmitting material illuminated by the light source. In one instance the light source may comprise an individual light positioned at the interior lower end portion on each of the front and rear posts. In an other instance, the light source comprises an individual light at the interior upper end portion of each of the front and rear posts.

Each of the posts of the shelving assembly has a plurality of equally spaced apart annular grooves on the outside surface thereof to facilitate connection of the shelf. The lighted posts exhibit contrasting light at the grooves and the remaining portions of the posts. The light source associated with the posts may comprise a source of white light or light of different hues.

BRIEF DESCRIPTION OF THE DRAWINGS

Novel features and advantages of the present invention in addition to those mentioned above will be become apparent to persons of ordinary skill in the art from a reading of the following detailed description of the invention in conjunction with the accompanying drawings wherein similar reference characters refer to similar parts and in which.

DETAILED DESCRIPTION OF THE INVENTION

Figure 1:
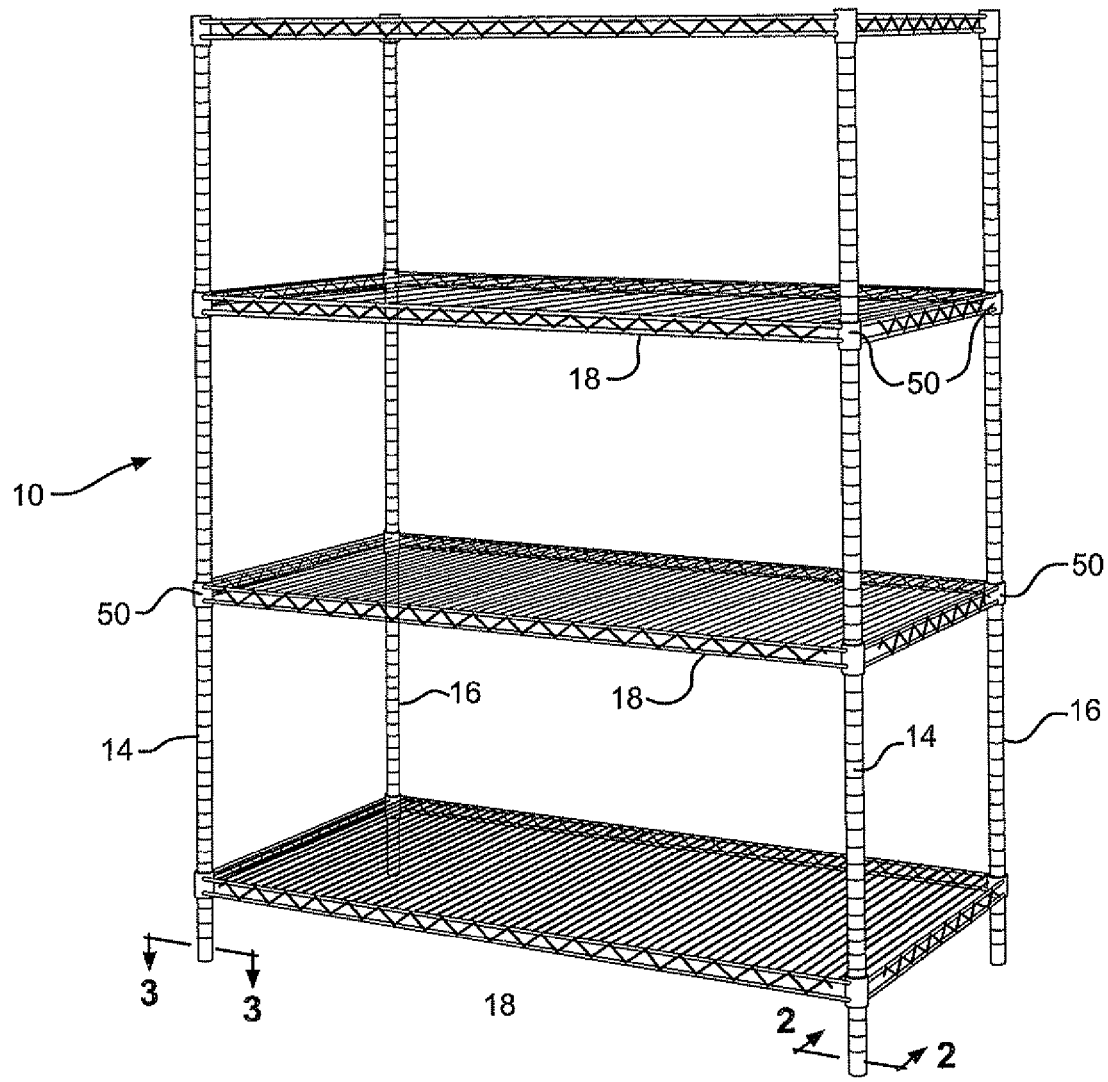
FIG. 1 is a perspective view of an adjustable shelving assembly with upright lighted posts, according to the present invention.

Referring in more particularity to the drawings, FIG. 1 shows an adjustable shelving assembly 10 comprising a plurality of upright shelf supporting posts that include two front posts 14 and two rear posts 16. A plurality of horizontally disposed shelves 18 are releasably and adjustably connected to the posts at the four corners of each shelf, as explained more fully below.

Each of the posts 14, 16 has an upper end portion 20 and a lower end portion 22. Also, the posts are hollow or solid and fabricated of clear/transparent light transmitting material such as acrylic material and the like, and a light source 24 is associated with each of the posts, as best show in FIGS. 2-7.

Figure 2:
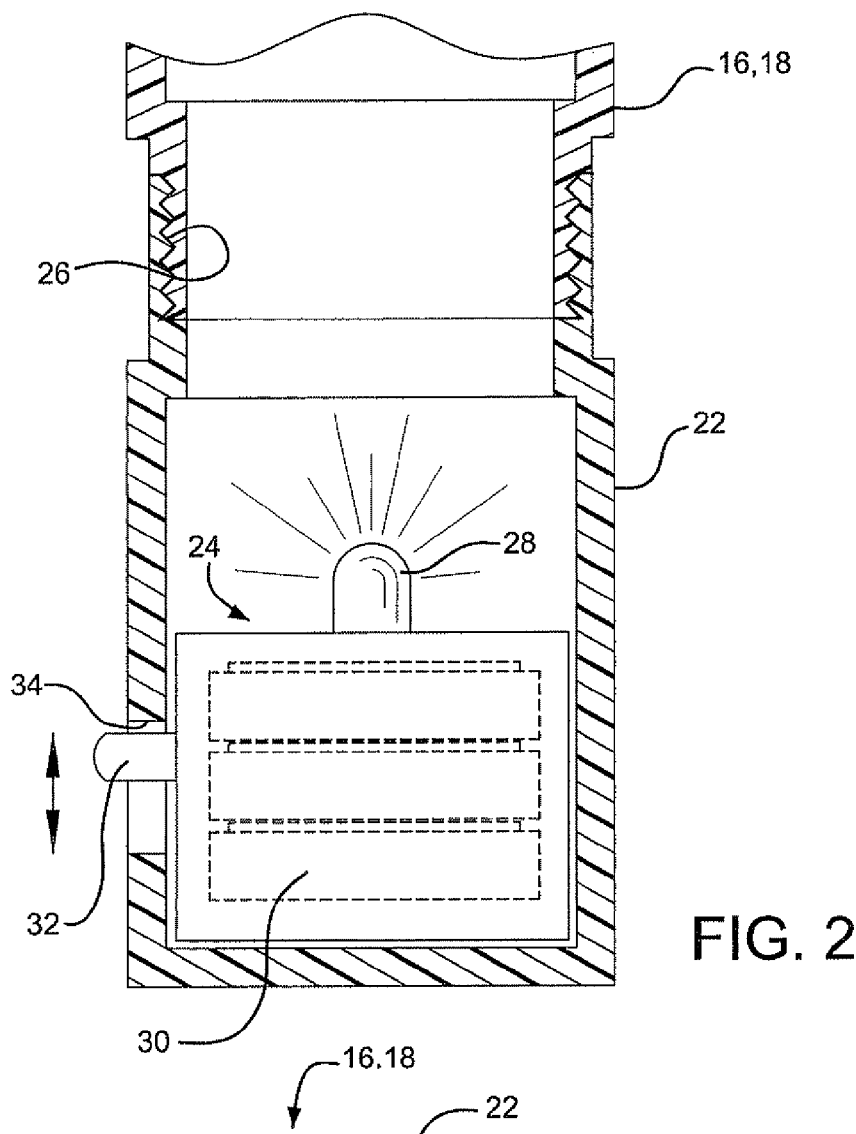
FIG. 2 is a sectional view taken along line 2-2 of FIG. 1.
Figure 3:
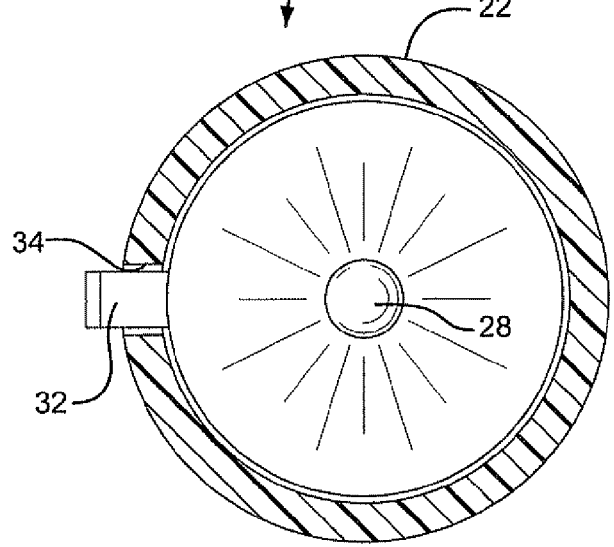
FIG. 3 is a sectional view taken along line 3-3 of FIG. 1.
Figure 4:
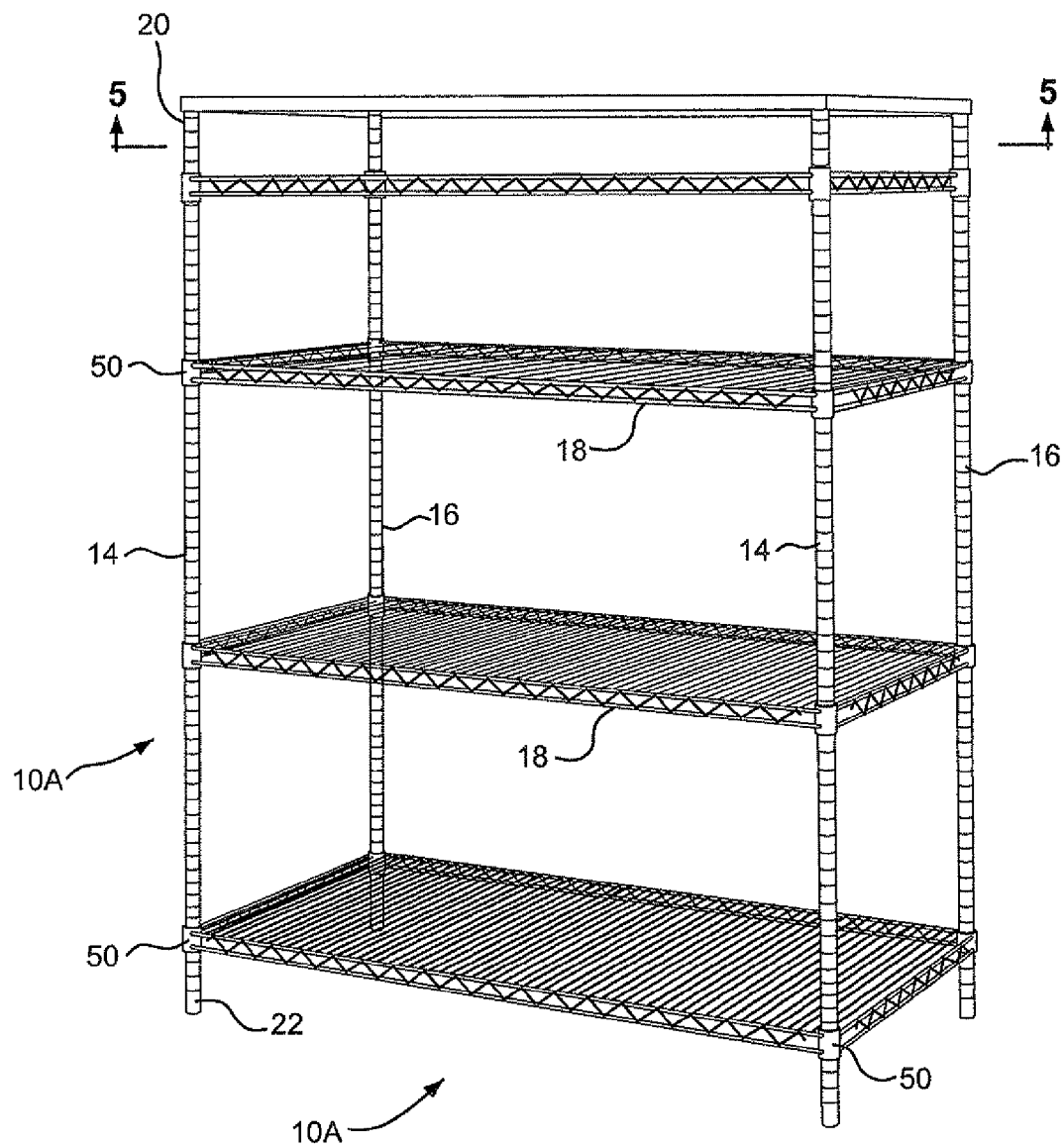
FIG. 4 is a perspective view of an alternate adjustable shelving assembly with upright lighted posts, according to the present invention.
Figure 5:
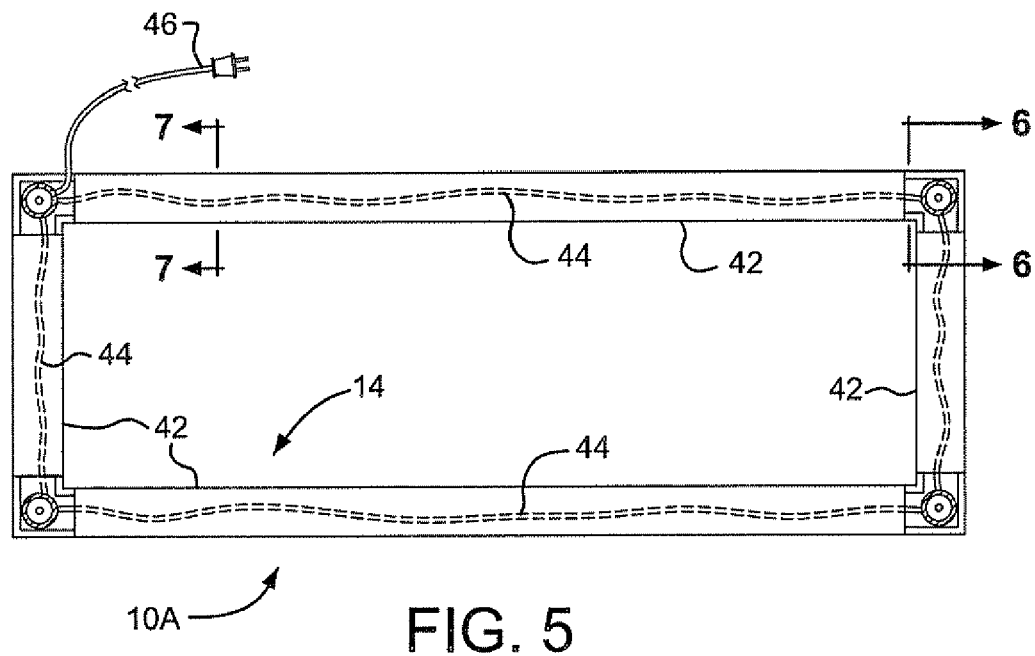
FIG. 5 is a sectional view taken along line 5-5 of FIG. 4.
Figure 6:
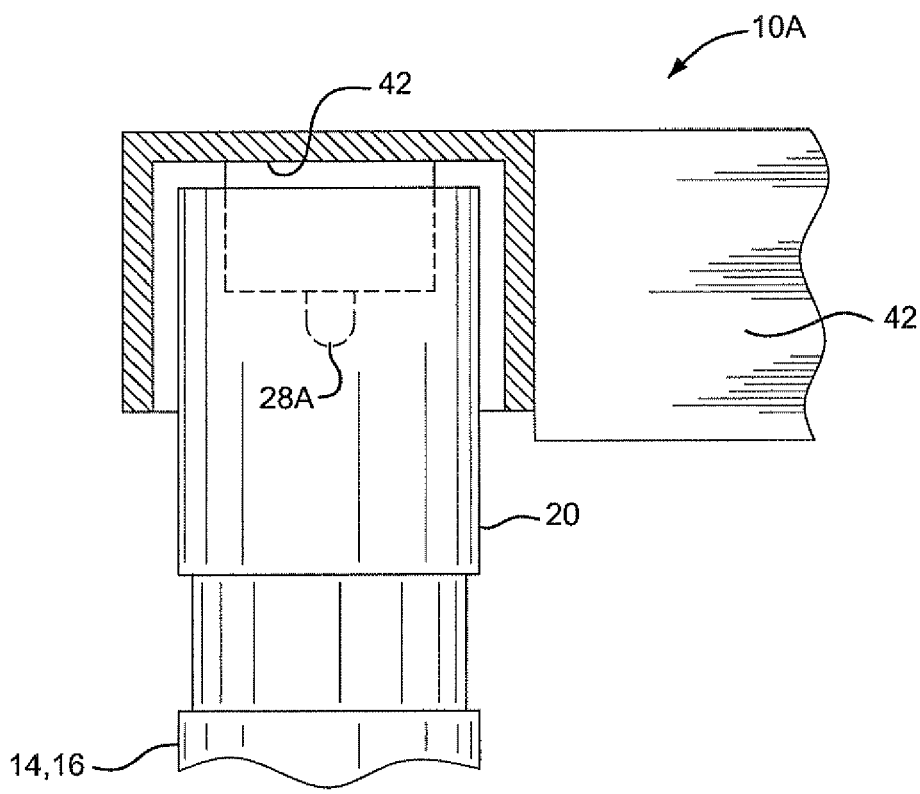
FIG. 6 is a sectional view taken along line 6-6 of FIG. 5.
Figure 7:
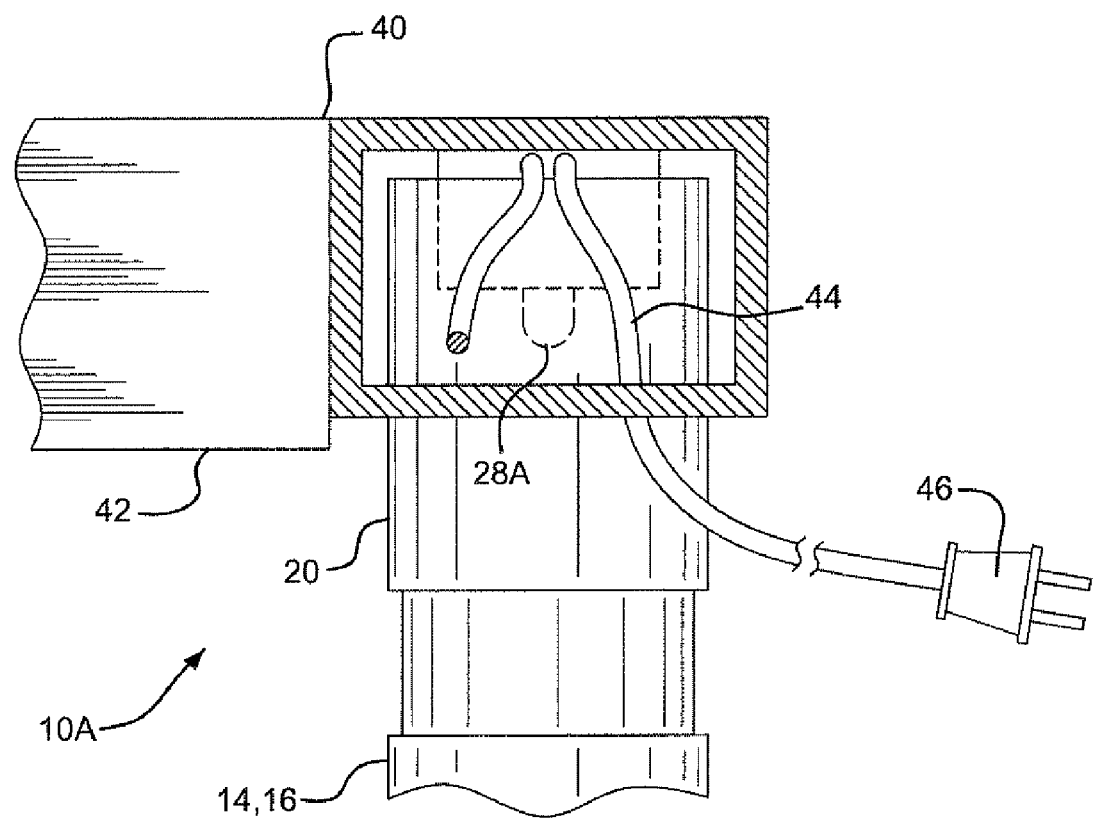
FIG. 7 is a sectional view taken along line 7-7 of FIG. 5.

In one embodiment of the invention and as best shown in FIGS. 1-3, the lower end portion 22 of each of the posts 14, 16 is releasably secured to the remainder of the post by a threaded connection 26. The light source 24 may comprise a bulb 28 connected to a rechargeable battery pack 30 with an on/off switch 32 suitable connected to the battery pack. As shown best in FIGS. 2 and 3, the switch 32 extends through an opening 34 in the lower end portion 22 of the posts 14, 16. When the bulb 28 is lighted, the light is transmitted upwardly through the posts 14, 16 to illuminate the posts and thereby provide a decorative affect to the adjustable shelving assembly 10.

FIGS. 4-7 illustrate an alternate embodiment 10A of the adjustable shelving assembly of the present invention. The embodiment 10A is somewhat similar in many respects to the assembly 10 illustrated in FIGS. 1-3, the only significant difference being the light source 24A of the shelving assembly show in FIGS. 4-7.

Light source 24A comprises a rectangular frame 40 with an open center positioned at the upper end of the shelving assembly. The rectangular frame includes inverted U-shaped channels 42 that fit over and interconnect of upper end portions 20 of the upright posts 14, 16. A bulb 28A within the inverted channels 42 is provided at the upper end portion 20 of each post, and the bulbs are interconnected by wiring 44 to an external plug 46 adapted to be connected to a suitable source of electricity. When the bulbs 28A are energized the light shines in a downward direction thereby illuminating each of the posts 14, 16.

Any color light may be used to illuminate the posts of assemblies 10, 10A and thereby provide the decorative affect to the shelving assembly. White light or light of various hues may be used. Lights of the same or different colors may be used in the same shelving assembly, if desired.

The connection of the shelves 18 to the upright posts 14, 16 is well known in the art and basically comprises a two piece sleeve (not shown) having an exterior frusto conical surface and an interior cylindrical surface that includes an inwardly extending annular projection or rib. Each two piece sleeve fit over a posts 14, 16, and the annular projection or rib on the inside thereof fits into one of the annular grooves on the posts at the desired elevation of the shelf. The shelves in turn include frusto conical collars 50 at the corners thereof and each collar fit over the frusto conical surface of the two piece sleeve to thereby releasably secure the shelves to the posts.

Another aspect of the present invention is the use of rectangular box-like enclosure (not shown) at the bottom and/or top of shelving assembly with supports, wiring and bulbs inside the box for illuminating the posts.

What is claimed is:

1. A retail shelving assembly comprising:
    a plurality of upright posts, each post comprising an upper end portion and a lower end portion, at least some of the posts comprising transparent light transmitting material;
    at least one horizontally disposed shelf releasably and adjustably connected to the posts, -wherein said upper end portion is above a topmost shelf and said lower end portion is below a lowermost shelf, wherein said topmost shelf and said lowermost shelf may comprise a same one shelf or two different shelves; and
    a first plurality of associated individual lights, wherein at least one of the first plurality of associated individual lights is positioned below the lowermost shelf within one of the plurality of upright posts comprising transparent light transmitting material and disposed within the lower end portion, directing light upwardly into the one upright post to illuminate all or a portion of said one upright post, wherein the upright posts comprise two front posts and two rear posts, and at least the two front posts comprise transparent light transmitting material each illuminated by its associated individual light positioned within each of said posts below the lowermost shelf and disposed within the lower end portion of said posts, wherein both the front and rear posts comprise transparent light transmitting material each illuminated by its associated individual light positioned within each of said posts below the lowermost shelf and disposed within the lower end portion of said posts;
    a second plurality of associated individual lights, wherein at least one associated individual light of the second plurality is positioned within one upright post above the topmost shelf and is disposed within the upper end portion of said upright post directing light downwardly into the upright post to illuminate all or a portion of said upright post, and a frame of inverted U-shaped channels interconnecting the upper end portions of the upright posts, and wherein the individual lights of the second plurality are inside the channels.

2. A retail shelving assembly as in claim 1, wherein each of the upright posts has a plurality of equally spaced apart annular grooves on an outside surface thereof.

3. A retail shelving assembly as in claim 1, wherein each of the upright posts is hollow.

4. A retail shelving assembly as in claim 1, wherein the plurality of associated individual lights comprises a light source selected from the group consisting of white light and lights of various hues.

5. A retail shelving assembly of claim 1, wherein none of the first plurality of individual lights and the second plurality of individual lights are positioned between a topmost shelf and a lowermost shelf.

6. The retail shelving assembly of claim 1, wherein at least a portion of the transparent light transmitting material is solid.

7. The retail shelving assembly of claim 1, wherein the lower end portion is releasably connected.

8. The retail shelving assembly of claim 1, wherein the upper end portion is releasably connected.

9. A retail shelving assembly as in claim 1, wherein each of the upright posts is solid.

* * * * *

UNITED STATES PATENT AND TRADEMARK OFFICE
CERTIFICATE OF CORRECTION

PATENT NO. : 8,113,678 B2  
APPLICATION NO. : 12/507177  
DATED : February 14, 2012  
INVENTOR(S) : Leonard K. Babcock et al.

Page 1 of 1

It is certified that error appears in the above-identified patent and that said Letters Patent is hereby corrected as shown below:

Column 3, Claim 1, Line 18, delete "-" before the word "wherein" so that line 18 reads as follows:
"adjustably connected to the post, wherein said upper".

Signed and Sealed this
Twenty-fifth Day of December, 2012

David J. Kappos
*Director of the United States Patent and Trademark Office*